(12) United States Patent
Janner et al.

(10) Patent No.: US 6,357,643 B1
(45) Date of Patent: Mar. 19, 2002

(54) ROOF EXTENSION FOR A MOTOR VEHICLE

(75) Inventors: Hans Janner, Allmersbach; Gerhard Mack, Winnenden, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/518,617

(22) Filed: Mar. 3, 2000

(30) Foreign Application Priority Data

Mar. 3, 1999 (DE) .......................................... 199 09 141

(51) Int. Cl.$^7$ ................................................. B60R 9/00
(52) U.S. Cl. ..................... 224/310; 224/309; 224/324
(58) Field of Search ................................ 224/310, 309, 224/320, 321, 324, 326, 327, 281; 414/462

(56) References Cited

U.S. PATENT DOCUMENTS

| 3,963,136 A | * | 6/1976 | Spanke .................... 224/310 X |
| 4,887,750 A | * | 12/1989 | Dainty .................... 224/310 X |
| 5,058,791 A | * | 10/1991 | Henriquez et al. .......... 224/310 |
| 5,360,150 A | * | 11/1994 | Praz ............................ 224/310 |
| 5,535,929 A | * | 7/1996 | Neill .......................... 224/310 |
| 5,544,796 A | * | 8/1996 | Dubach ....................... 224/310 |
| 5,884,824 A | * | 3/1999 | Spring, Jr. ................... 224/310 |
| 5,988,470 A | * | 11/1999 | Siciliano ..................... 224/310 |
| 6,015,074 A | * | 1/2000 | Snavely et al. ............. 224/310 |

FOREIGN PATENT DOCUMENTS

FR 2636897 A * 3/1990 ................. 224/310

* cited by examiner

Primary Examiner—Stephen K. Cronin
Assistant Examiner—Maerena W. Brevard
(74) Attorney, Agent, or Firm—Crowell & Moring LLP

(57) ABSTRACT

A roof extension for a motor vehicle has at least two roof members which are mounted by way of fastening devices on the vehicle roof. Guide rails are arranged approximately parallel to one another, along which a ladder can be displaced from a starting position into a transport position on the vehicle roof and can be fixed in its end position. For the sliding guidance at least on one end of the ladder, laterally projecting guiding devices are arranged, and the ladder, after the fixing is eliminated, can be displaced back into the starting position. The guide rails extend close to the fastening points of the roof members, the guiding devices being held by laterally projecting extension arms of the ladder.

13 Claims, 2 Drawing Sheets

ROOF EXTENSION FOR A MOTOR VEHICLE

BACKGROUND AND SUMMARY OF THE INVENTION

This application claims the priority of 199 09 141.2, filed Mar. 3, 1999, the disclosure of which is expressly incorporated by reference herein.

The present invention relates to a roof extension for a motor vehicle, and more particularly, to a roof extension having at least two roof members which, by way of fastening devices are mounted on the vehicle roof, and having guide rails arranged approximately in parallel to one another, along which a ladder can be displaced from a starting position into a transport position on the vehicle roof and can be fixed in its end position, for the sliding guidance, at least on one end of the ladder, laterally projecting guiding devices being arranged, and is the ladder, after the fixing is eliminated, being displaceable back into the starting position, A roof extension for a motor vehicle is shown in U.S. Pat. No. 2,922,551. A roof carrier is indicated there whose horizontally extending rectangular frame is mounted by four fastening devices on the vehicle roof. On the bottom side of the frame, two guide rails are fastened which are arranged approximately parallel to one another and extend in the transverse direction of the vehicle along the guide rails, a ladder can be displaced from a starting position supported by the lower end on the ground into a horizontal transport position on the vehicle roof and can be fixed there in its end position. For the sliding guidance of the latter, two laterally projecting guiding devices are arranged on its upper end. After the fixing in the transport position is eliminated, the ladder can be slid back again into the leaning starting position.

It is a disadvantage of the roof carrier that the guide rails constructed as angle profiles have a considerable lateral distance from the supporting fastening points of the roof carrier. Because of this arrangement of the ladder, a considerable vibration of the entire roof extension may occur in the driving operation.

Another known roof extension is Japanese Patent Document described in JP 08-158768, in which the guide rails also extend at a considerable lateral distance from the supporting fastening points of the roof carrier.

Other objects, advantages and novel features of the present invention will become apparent from the following detailed description of the invention when considered in conjunction with the accompanying drawings.

SUMMARY OF THE INVENTION

An object of the present invention is to provide a roof extension having an improved vibration behavior during the transport of a ladder.

According the invention, this object has been achieved by a roof extension in which the guide rails extend close to the fastening points of the roof members, the guiding devices being held by laterally projecting extension arms of the ladder.

As the result of the laterally projecting extension arms which hold the guiding devices, the guide rails can be arranged close to the fastening points of the roof members. A fastening of the guide rails on the roof members can be provided so that the vibration of the ladder during the transport can be significantly reduced. If the ladder is used in a starting position fixed on the guide rails for the loading and unloading of a roof carrier, furthermore, the undesirable bending of the roof members can also be significantly reduced. The guide rails of the ladder and the roof members can extend side-by-side, preferably approximately parallel to one another, or transversely and approximately vertically. By way of the arrangement of the guiding devices on the extension arms, it is additionally possible to arrange the ladder on an already existing roof railing, for example, of a station wagon, in which case the guide rails would have to be provided on the roof members of the roof railing which preferably extend in the longitudinal direction of the vehicle. It would also be conceivable to use the roof extension according to the present invention as a secure transport possibility for a ladder which, in its starting position, can be used, for example, for workers at construction sites or in the household.

In an embodiment of the roof extension of the present invention a connection is established between the respective guide rail and the assigned roof member which has a particularly stable construction against a bending and against vibrations.

A one-piece construction of the roof member and of the respective guide rail can be produced in a particularly simple manner, in which case the guide rail can be matched particularly well with respect to its length and shape with the roof member.

In another embodiment, the roof extension according to the invention can be retrofitted in a particularly simple manner with guide rails for the arrangement of the ladder.

A ladder, which, by way of its upper end, is easily detachably fastened on the guide rails and, by way of its lower end, is supported on the ground, permits a secure and simple loading of a roof carrier or of a roof box and, in addition, can be removed in a simple manner when it is not needed.

If, in addition to the one end of the latter, laterally projecting extension arms and guiding devices are also arranged on the other end of the ladder, the ladder can be held above the roof by the guiding devices within the guide rails and must only be secured against a sliding out of the guide rails. In addition, the ladder can be slid into the guide rails and pulled out of the latter from opposite ends, so that the roof extension can be loaded on both sides.

In yet another embodiment of the roof carrier, the guiding devices, which already exist, each have a locking device which permit a simple fixing of the ladder.

A further development of the roof carrier permits an adaptation to the spacing of the guide rails which varies, for example, in the case of different vehicle models.

Because of their simple and maintenance-free construction, particularly sliding blocks were found to be advantageous for a use as guiding devices within the guide rails.

A ladder which is constructed in two or several parts can be adapted in a simple manner to the corresponding vehicle width, in which case a telescoping ladder also has a low wind resistance in the transport position.

The extension arms, which are formed by a continuous tube, not only have a relatively simple and stable construction, but, for a simpler loading of the roof carrier, the ladder can also be displaced along the tube.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
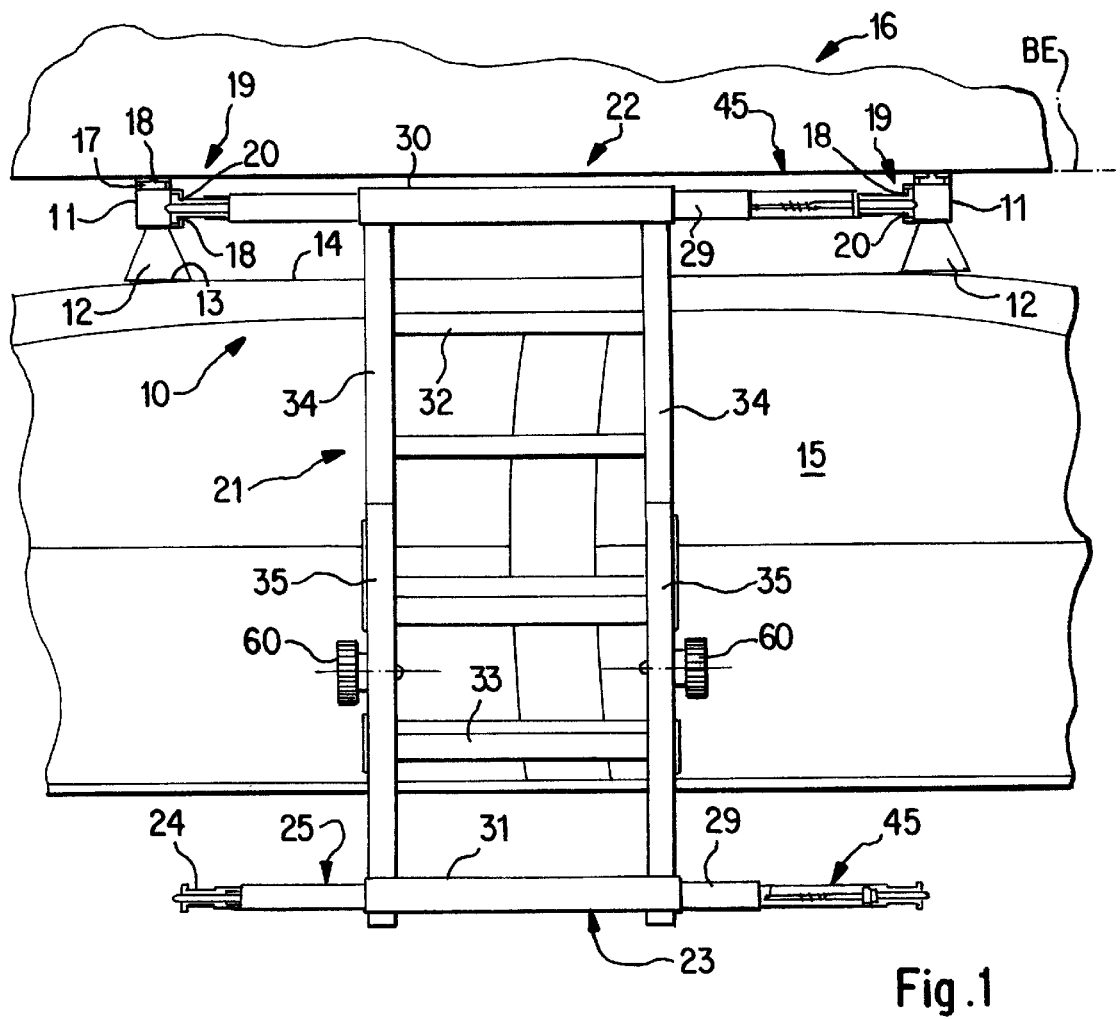
FIG. 1 is a schematic side view of a motor vehicle having a roof extension according to a currently preferred embodiment of the invention.

FIG. 1 is a side view of a motor vehicle with a roof extension constructed as a roof carrier 10, which comprises two roof members 11 which extend in the transverse direction of the vehicle and approximately parallel to one another, and which are supported and fastened by four fastening devices 12, which are arranged laterally in the front and rear, at fastening points 13 on the vehicle roof 14. In this case, the roof members 11 essentially have an approximately square cross-section and are preferably produced from a metallic material or from a plastic material. The fastening devices 12 comprise supports which are supported, for example, laterally on the vehicle roof 14 or in a drain between the vehicle roof and one of the vehicle sides 15. In addition, a clamping shoe is assigned to each fastening device 12 and reaches laterally around the vehicle roof 14, thereby fixing the roof carrier 10. It would also be within the scope of the present invention to use other known fastening devices 12, such as suction cups or the like, to provide a secure fixing of the roof members 11 on the vehicle roof 14 can be achieved. The roof carrier 10 may also be fastened on one roof railing respectively arranged laterally on the vehicle roof 14. Above a loading plane BE formed by the top sides of the two roof members 11, a roof box 16 is arranged to be slidable in upper guides 17 of the roof members 11 in the transverse direction of the vehicle and to be fixed thereon. The upper guides 17 are constructed in one piece with their associates roof member 11 and have an approximately box-shaped profile with a groove 18 placed in the respective top side of the roof member 11. The groove 18 extends parallel to the roof member 11.

On the mutually facing interior sides 19 of the two roof members 11, one guide rail 20 respectively is provided which also comprises an approximately box-shaped profile with a groove 18 extending on the interior side of the respective roof member 11 or the respective guide rail 20. In this case, the guide rails 20 extending close to the fastening points 13 of the roof members 11 are constructed in one piece with the respectively associated roof member 11 and extend approximately parallel to one another. Instead of the one-piece further development of the guide rails 20 with the respective roof member 11, these can also be constructed separately and can be detachably fastened, for example, by screwed connections, on their assigned roof member 11. Along the guide rails 20, a ladder 21 can be displaced from a starting position, which is leaning or vertically depending in the embodiment illustrated here, into an approximately horizontal transport position above the vehicle roof 14 and fixed there. The ladder 21, after the fixing is eliminated, can be displaced back into the leaning starting position and used there for a simpler loading of the roof box 16. Like the guide rails 20, the ladder 21 held in its transport position is also arranged in the clearance between the vehicle roof 14 and the loading plane BE of the roof carrier 10 and extends in its longitudinal course approximately in the transverse direction of the vehicle.

On its upper as well as lower end 22, 23 in the starting position, the ladder 21 has two laterally outward-projecting guiding devices 24 respectively, which are held by laterally projecting extension arms 25 of the ladder 21. The two extension arms 25 are formed by a continuous tube 29 at whose ends one respectively of the guiding devices 24 constructed as sliding blocks are arranged. The ladder 21, in addition, has, on its upper and lower end 22, 23, an upper and lower rung 30, 31 which is constructed as a tube and surrounds the respective tube 29 with play, so that the ladder 21 can be swivelled about the assigned tube 29 and be displaceably guided along this tube 29 in the longitudinal direction of the vehicle. For fixing the rungs 30, 31 on the respective tube 29 or for fixing the ladder 21 relative to the guide rails 20, a clamping screw or similar clamping device may be arranged which is not shown.

In order to provide an adaptation of the length of the ladder 21 in the starting position, in which it is fixed by its upper end 22 on the guide rails and is supported by its lower end 23 on the ground, to the length of the ladder 21 in the transport position, the ladder 21 is constructed in two parts, i.e., an upper and a lower ladder part 32, 33. In this case, both members 34 of the upper ladder part 32 can be displaced in a telescoping manner with respect to the members 35 of the lower ladder part 33. In the embodiment illustrated here, the upper and the lower members 34, 35, and thus the two ladder parts 32, 33, must be braced with one another by one handle 60 respectively arranged laterally of the members 34, 35. However, in the leaning starting position of the ladder 21, the two ladder parts 32, 33 are preferably not braced with respect to one another, but can be displaced with respect to one another in a telescoping manner. Thereby, during the loading of the roof carrier 10 and the compression of the motor vehicle possibly connected therewith, no bracing of the ladder 21 can occur between its fixing on the guide rails 20 and the ground.

Figure 2:
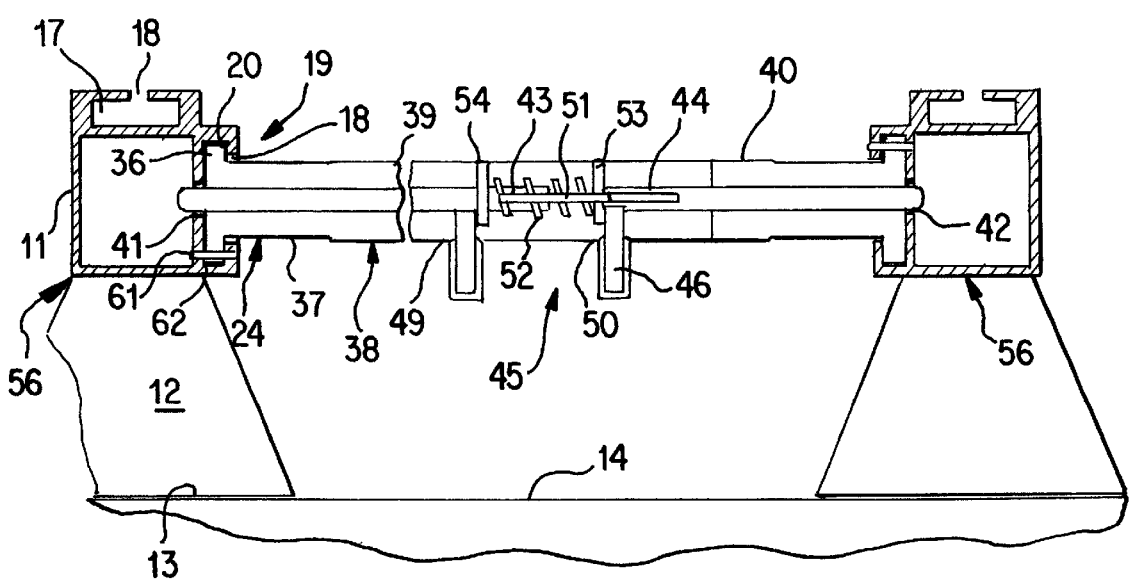
FIG. 2 is an enlarged schematic sectional view of the roof extension according to the invention of a tube arranged on the end side of a latter, with guiding devices guided in guide rails.

As illustrated particularly in combination with the sectional view illustrated in FIG. 2 of the tube 29 and the guiding devices in the form of sliding blocks 24 on the upper end 22 of the ladder 21, the guiding devices 24 are constructed as approximately T-shaped sliding blocks made of plastic, whose respective head section 36, while the cross-sectional plane extends in the transverse direction of the vehicle, has an approximately rectangular cross-section and whose base section 37 has an approximately circular cross-section. It would also be within the scope of the present invention to further develop the head section 36 with an approximately circular cross-section or provide it with a running wheel guided within the guide rails 20. It would also be contemplated to further develop the base section 37 with an approximately circular cross-section. On its free end facing away from the head section 36, the cylindrical base section 37 is provided with a thread 38 for screwing the sliding block 24 into the pertaining end of the tube 29. For the adaptation to the spacing of the two guide rails 20, the two sliding blocks 24 can be screwed more or less deep, at the respective end into the tube 29. Instead of a screwed connection of the sliding blocks 24 and of the tube 29, the sliding block can, for example, be received against a spring force displaceably within the tube 29. It would also be possible to connect the sliding block 24 fixedly with the tube 29 or construct it in one piece with this tube 29.

Figure 3:
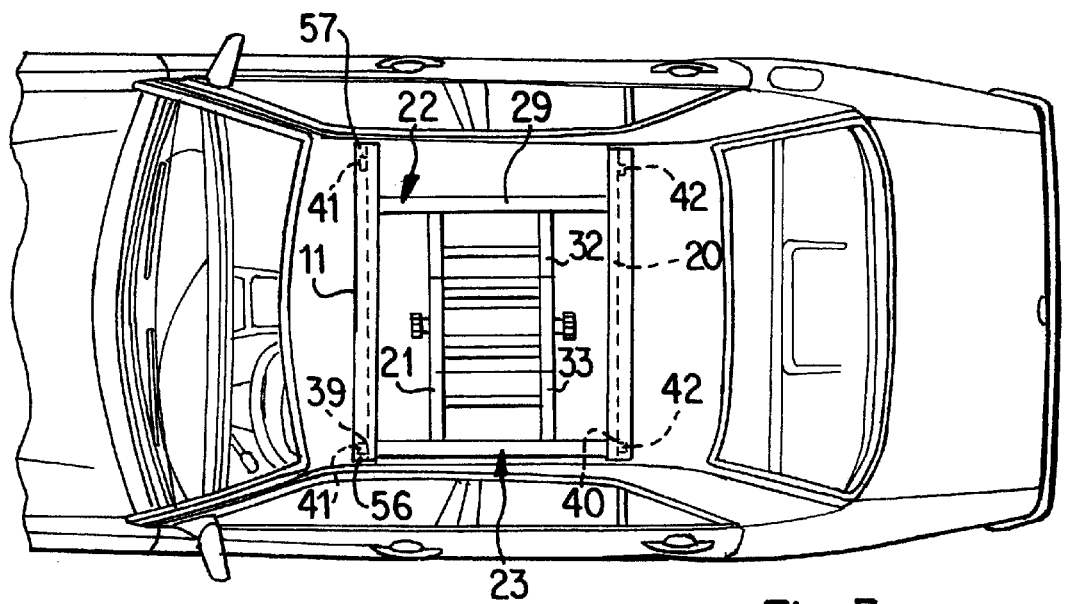
FIG. 3 is a schematic top view of the motor vehicle with the roof extension according to the invention, the ladder being illustrated in the transport position.
Figure 4:
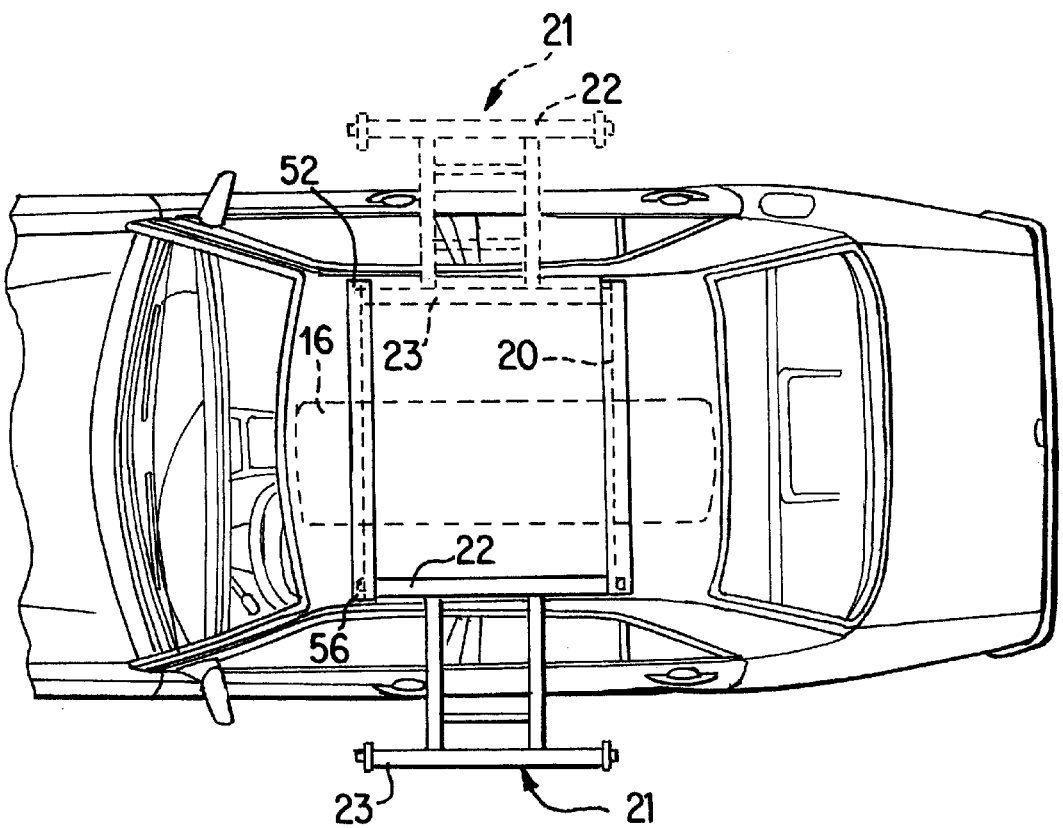
FIG. 4 is a schematic top view of the motor vehicle having the roof extension according to the invention, the ladder being shown in its two starting positions.

Axially within the respective tube 29 and centrally of the sliding blocks 24, two rods 39, 40 are each provided which lock in matching indentations 41, 42 in the slide rails 20 and thereby fix the tube 29 and the assigned end 22, 23 of the ladder 21 on the guide rails 20. For this purpose, the indentations 41, 42 25 are arranged in the area of the opposite ends 56, 57 (FIG. 3) of the respective guide rail 20. At the rod ends 43, 44 facing away from the guide rails 20, a central operating element 45 is provided 45 so that the rods 39, 40 can be unlocked again from the indentations 41, 42. As a result, the sliding blocks are displaceable again within the guide rails 20, in which case, during this displacement, the rod ends 43, 44 slide along the guide rails 20. The central operating element 45 is essentially arranged close to one end inside the tube 29 and comprises two grips 46 which reach through the tube 29 oblong holes 49, 50 and which are connected with the respective rod end 43, 44 and preferably are operated manually. In this case, it is contemplated to couple the two operating elements 45 with one another on the respective end 22, 23 of the ladder 21 by Bowden cables or the like. The grips 46 allow the two rods 39, 40, whose rod ends 43, 44 are guided by a guide rod 51, to be moved with respect to one another against the spring force of a spring 52 which is supported on collars 53, 54 on the rod ends 43, 44 and can be unlocked thereby from the indentations 41, 42 in the guide rails 20. So that the ladder 21 cannot unintentionally be pulled with both tubes 29 completely out of the guide rails 20, respective removable securing pins 61 (FIG. 2) are provided at their ends 56, 57 (FIGS. 3, 4). Corresponding to the securing pins 61 which are arranged on the guide rails 20 in different manners, recesses 62 are shaped into the sliding blocks 24 so that, in each case, only the matching tube 29 can be pulled out at one end 22, 23 of the ladder 21. By the removal of the securing pins 61, the ladder 21 can be completely removed.

In FIG. 3, the ladder 21 is illustrated schematically in its transport position on the vehicle roof, with the two ladder parts 32, 33 being pushed together and their members 34, 35 being braced with one another. The tube 29 which, in the starting position according to FIG. 1, is arranged at the lower end 23 of the ladder 21, is fixed by the rods 39, 40 illustrated by broken lines in the indentations 41, 42 at the assigned ends 56 of the guide rails 20. The length of the ladder 21 is selected such that the tube 29 arranged at the other end 22 of the ladder 21 is not fixed on the indentations 41, 42 at the associated end 57 of the guide rails 20. However, it would also be possible to fix both tubes 29 in the indentations 41, 42 at the assigned end 56, 47 of the guide rails 20, but the handle 60 would have to be released before the ladder 21 is displaced into the leaning starting position. During the displacement of the ladder into the starting position, the locking is first released at one end 23 and the ladder 21 is pulled out until the tube 29 arranged at its other end 22 is fixed in the indentations 41, 42 by way of the rods 39, 40. An unintentional complete pulling-out of the ladder 21 is additionally prevented by the securing pins 61 (FIG. 2).

The ladder 21, which is fixed at its upper end 22 on the guide rails 20, can now be swivelled downward from the horizontal position about the upper rung 30 and can be lengthened by opening the handle 60 until it is supported on the ground by its lower end 23. During the displacement from the starting position back into the transport position, the ladder 21 is first shortened again and is secured in the shortened arrangement by way of the handle 60. Then the ladder 21 can again be swivelled into the horizontal position and by the release of the locking at the upper end 22 can be pushed in until it is releasably fixed again with its lower end 23 by the locking rods 39, 40.

As schematically illustrated in FIG. 4, the ladder 21 can be displaced on both sides of the motor vehicle into the starting position. Furthermore, in the case of motor vehicles of a single-volume form, such as vans, large-capacity sedans or the like, the guide rails 20 and the ladder 21 can be arranged in the longitudinal direction of the vehicle on the vehicle roof and to correspondingly be pulled out toward the front or rear.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Roof extension for a motor vehicle comprising at least two roof members mountable on the vehicle roof, and guide rails arranged approximately parallel to one another, along which a ladder can be displaced from a starting position into a transport position on the vehicle roof and can be fixed in an end position thereof, the ladder being provided with laterally projecting guiding devices, and being configured to be displaceable back into the starting position, wherein the guide rails extend close to fastening points of the roof members, and laterally projecting guiding devices are held by laterally projecting extension arms of the ladder; and wherein laterally projecting extension arms are provided at the lower end of the ladder, and the guiding devices project laterally form the laterally projecting extensions arm.

2. The roof extension according to claim 1, wherein the guide rails are each arranged on an associated side member.

3. The roof extension according to claim 2, wherein the guide rails are configured integrally with an associated roof member.

4. The roof extension according to claim 2, wherein the guide rails are detachably fastenable on an associated roof member.

5. The roof extension according to claim 1, wherein in the starting position, the ladder is detachable fixed by an upper end thereof on the guide rails and is supportable by a lower end thereof on the ground.

6. The roof extension according to claim 1, wherein the ladder is selectively slideable from opposite ends of the guide rails into and out of the guide rails.

7. The roof extension according to claim 1, wherein the guiding devices are arranged at the extension arms at the end of the ladder, each have a locking device which locks into the guide rails, the locking devices being unlockable by a central operating element.

8. The roof extension according to claim 1, wherein for adaptation to spacing of the guide rails, at least one of the guiding devices is adjustably arranged on the associated extension arm.

9. The roof extension according to claim 1, wherein the guiding devices are configured as sliding blocks guidable within the guide rails.

10. The roof extension according to claim 2, wherein the guide rails are arranged in a transverse direction of the motor vehicle, the ladder being constructed in at least two parts which are pushable together for an adaptation to a length of the guide rails.

11. The roof extension according to claim 1, wherein the laterally projecting extension arms are a continuous tube, the ladder being laterally displaceably guided along the tube.

12. The roof extension according to claim 1, wherein the guide rails and the ladder held in the transport position are arranged a clearance between the vehicle roof and a loading plane of a roof carrier.

13. The roof extension according to claim 12 wherein the guide rails are each arranged on an associated side member.

* * * * *